United States Patent
Lee et al.

(10) Patent No.: US 7,612,950 B2
(45) Date of Patent: Nov. 3, 2009

(54) ASPHERIC PLASTIC LENS AND MOLD FOR MANUFACTURING THE SAME

(75) Inventors: Young Ho Lee, Yongin-si (KR); Kwang Yun Choi, Uiwang-si (KR); Jin Su Seok, Suwon-si (KR)

(73) Assignee: Samsung Electro-Mechanics Co., Ltd., Gyunggi-Do (CN)

(*) Notice: Subject to any disclaimer, the term of this patent is extended or adjusted under 35 U.S.C. 154(b) by 157 days.

(21) Appl. No.: 11/679,717

(22) Filed: Feb. 27, 2007

(65) Prior Publication Data
US 2007/0268599 A1     Nov. 22, 2007

(30) Foreign Application Priority Data
May 17, 2006   (KR) .................. 10-2006-0044284

(51) Int. Cl.
*G02B 13/18*   (2006.01)
(52) U.S. Cl. ..................... 359/718; 359/724
(58) Field of Classification Search ............ 359/642, 359/718, 719, 724, 741, 565, 566, 570, 571
See application file for complete search history.

(56) References Cited

U.S. PATENT DOCUMENTS

| | | | | |
|---|---|---|---|---|
| 5,299,062 A | * | 3/1994 | Ogata | 359/571 |
| 6,052,232 A | * | 4/2000 | Iwaki | 359/642 |
| 6,765,732 B2 | * | 7/2004 | Yamamoto et al. | 359/811 |
| 7,349,161 B1 | * | 3/2008 | Shyu et al. | 359/642 |
| 7,406,223 B2 | * | 7/2008 | Ito | 385/33 |

FOREIGN PATENT DOCUMENTS

| | | |
|---|---|---|
| JP | 61-261015 A | 11/1986 |
| JP | 62-33417 U | 2/1987 |
| JP | 2005-70174 A | 3/2005 |
| JP | 2005-107117 A | 4/2005 |
| JP | 2005-262472 A | 9/2005 |
| KR | 2000-0006607 Y1 | 4/2000 |

* cited by examiner

*Primary Examiner*—Jordan M. Schwartz
(74) *Attorney, Agent, or Firm*—Lowe Hauptman Ham & Berner, LLP

(57) ABSTRACT

An aspheric plastic lens comprises a spherical surface portion having upper and lower portions at the center thereof, the upper and lower portions having curved surfaces with a different curvature, respectively; a rib formed in a circular plate shape so as to extend from the peripheral edge of the spherical surface portion to the outside, the rib having burrs formed to project on the edges of the upper and lower surfaces thereof; and a pair of two-stage step portions formed on the upper and lower surfaces of the rib, the two-stage step portions being formed symmetrically with each other.

7 Claims, 5 Drawing Sheets

[FIG. 1]
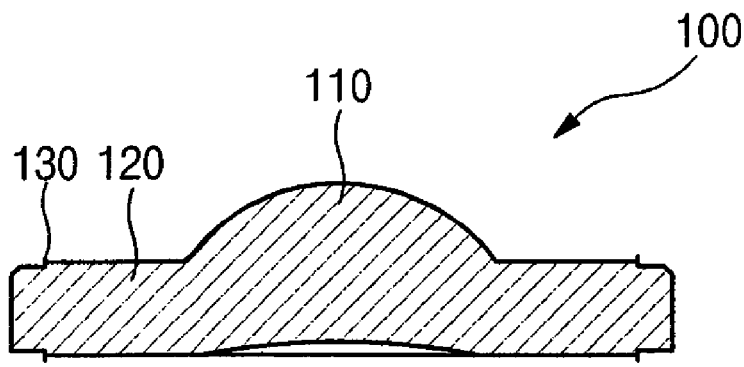
- PRIOR ART -
[FIG. 2]
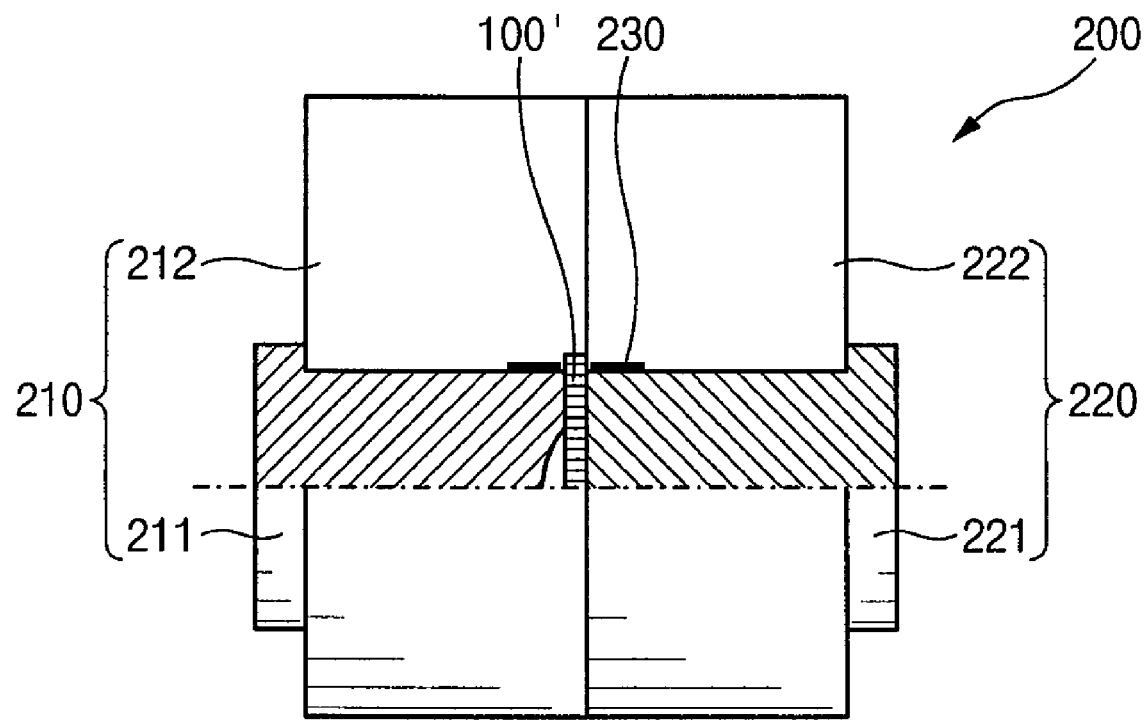
- PRIOR ART -

[FIG. 3]
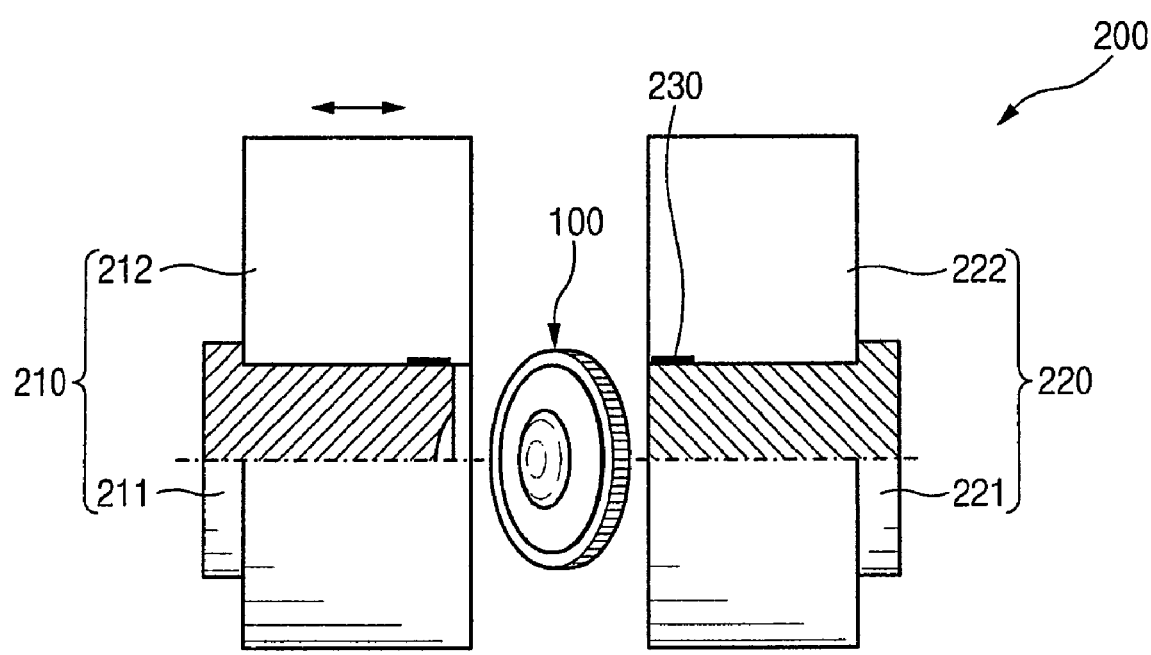
- PRIOR ART -

[FIG. 4]
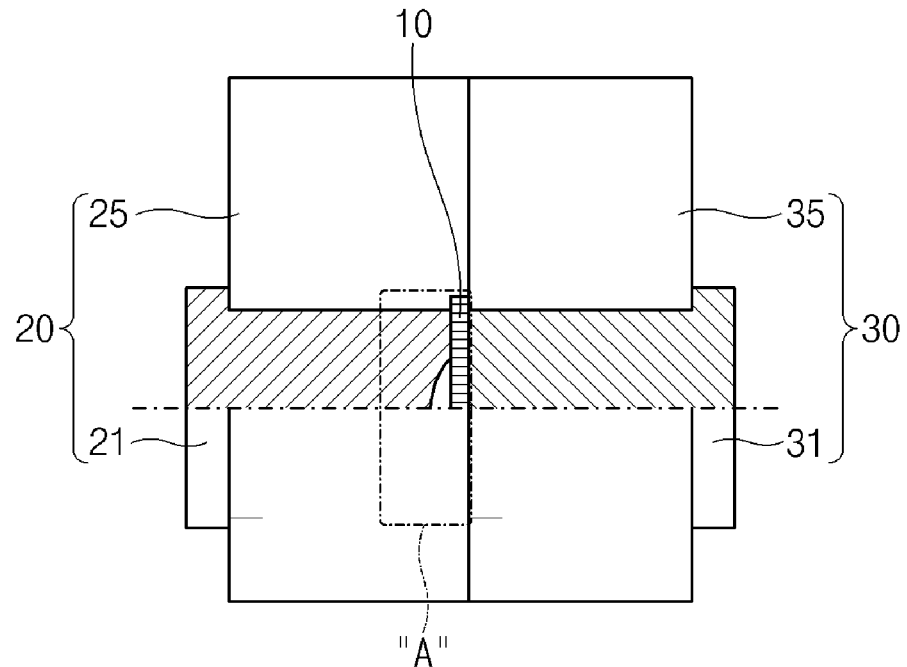
[FIG. 5]
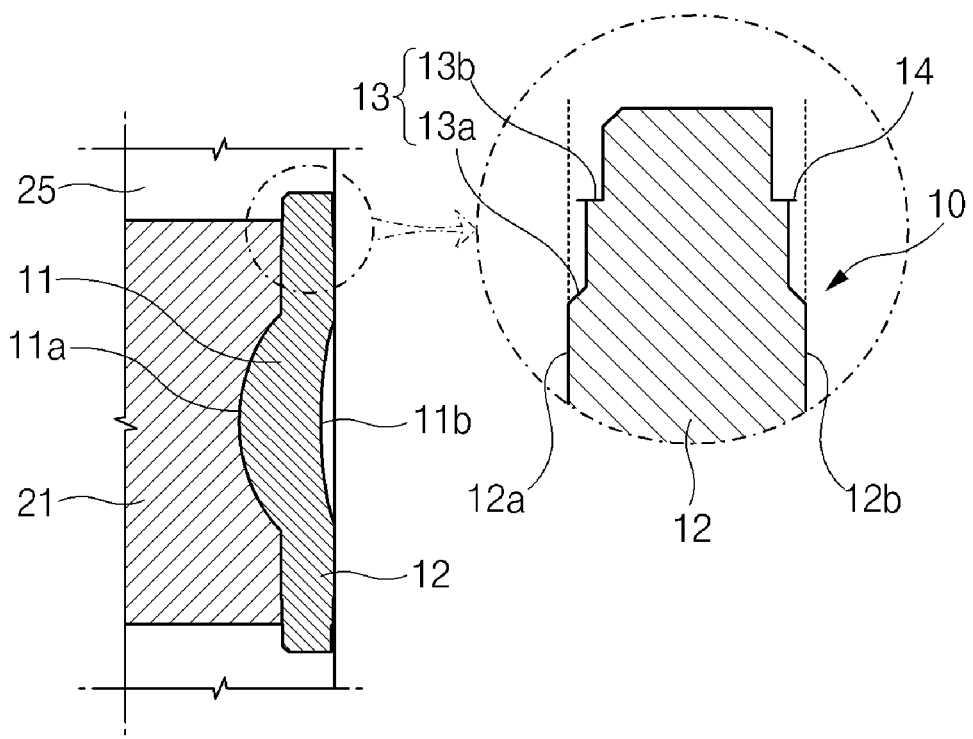

[FIG. 6]
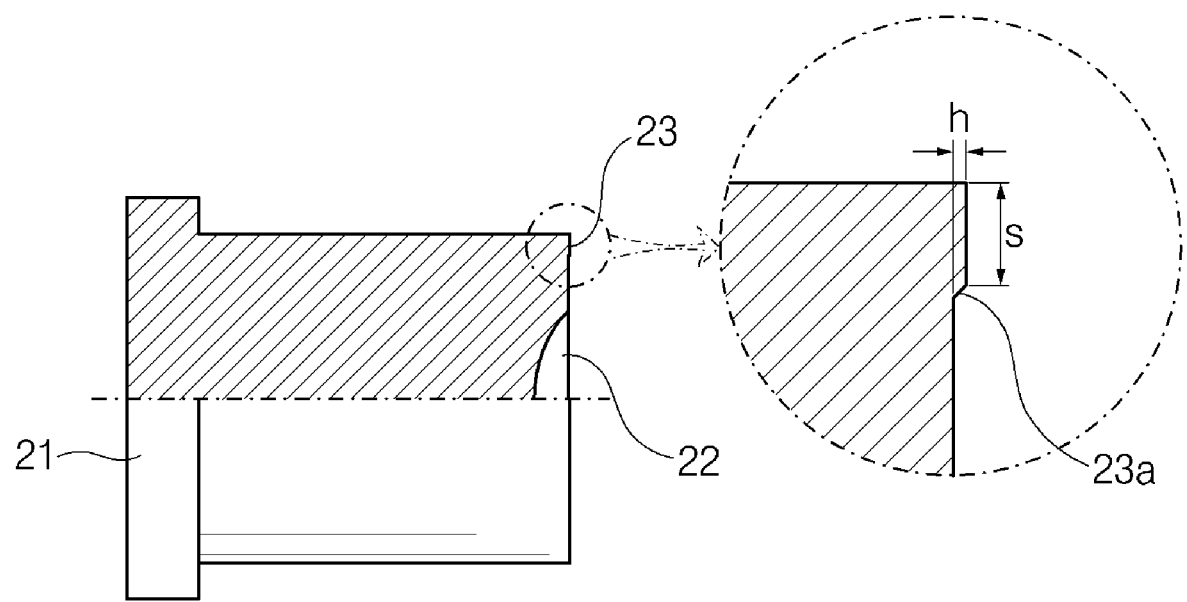
[FIG. 7]
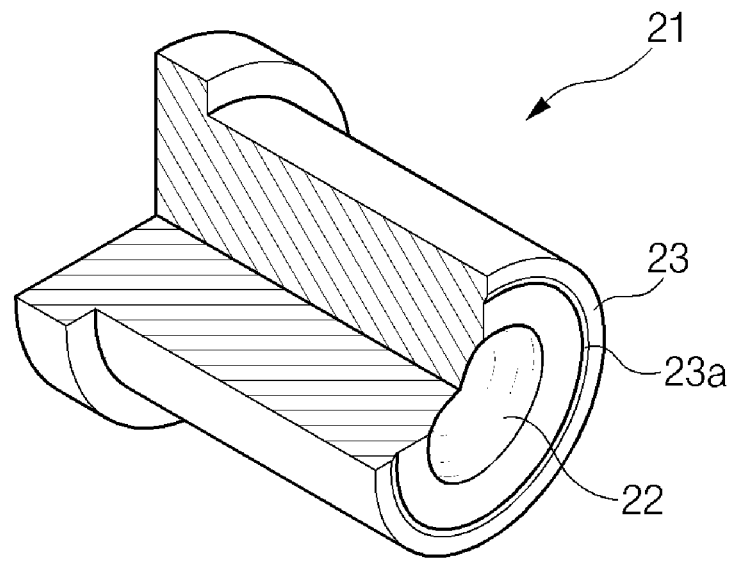

[FIG. 8]
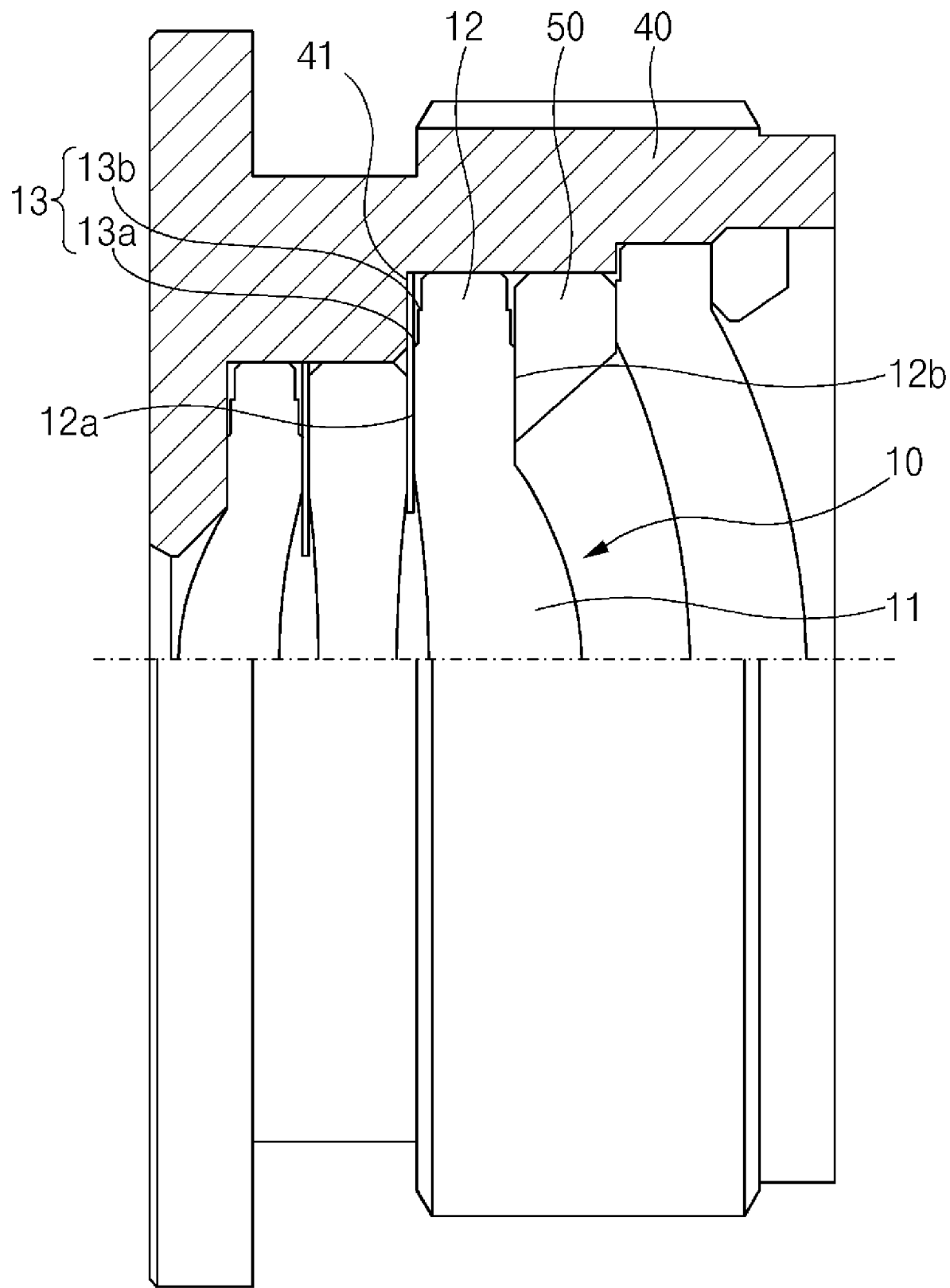

ASPHERIC PLASTIC LENS AND MOLD FOR MANUFACTURING THE SAME

CROSS-REFERENCE TO RELATED APPLICATIONS

This application claims the benefit of Korean Patent Application No. 10-2006-0044284 filed with the Korea Intellectual Property Office on May 17, 2006, the disclosure of which is incorporated herein by reference.

BACKGROUND OF THE INVENTION

1. Field of the Invention

The present invention relates to an aspheric plastic lens and a mold for manufacturing the same. In the aspheric plastic lens, a two-stage step portion is formed on a rib surface thereof such that optical performance is not influenced by burrs formed when the aspheric plastic lens is injection-molded. Then, the horizontal coupling between lenses in a lens barrel is achieved.

2. Description of the Related Art

With the recent development of mobile terminals such as portable phones and Personal Digital Assistants (PDAs), the mobile terminals provide a phone call function and are used as multi-convergence devices. The most representative of the multi-convergence devices is a camera module. The resolution of the camera module changes from 30,000 pixels (VGA) to 800,000 pixels.

Generally, compact camera modules (CCMs) are applied to various IT devices. Recently, products having the CCMs to meet consumers' various tastes are increasingly put on the market.

Such camera modules are manufactured by using image sensors and lenses as main parts, the image sensors including charge coupled device (CCD) and complementary metal oxide semiconductor (CMOS) image sensors. Incident light transmitted through the lens is condensed by the image sensor and is stored as data in the memory. The stored data is displayed as an image through a display medium, such as liquid crystal display (LCD) or PC monitor.

Recently, with the development of digital technologies, the improvement of image compression/decompression technologies, and the technical improvement of peripheral devices of multimedia products, lenses for the mobile cameras have been continuously developed and researched for slim profile and miniaturization. Further, the development of an aspheric plastic lens having a mega-pixel resolution is being accelerated, in which various aberrations can be controlled. Because of the aberrations, the shape of an object is deformed by an influence of light having a variety of wavelengths, the light being incident when the object is imaged.

The aspheric plastic lens is pressed between a pair of pin cores so as to be injection-molded. The plurality of lenses are sequentially laminated inside a cylindrical lens barrel, thereby forming a lens optical system ranging from a VGA quality to a mega quality.

While the aspheric plastic lenses are laminated and combined inside the lens barrel, the lenses can be tilted or floated so that a defective lens unit including the optical system can be manufactured. A lens having such a defect cause and a lens molding structure therefor will be described briefly with reference to FIG. 1.

FIG. 1 is a sectional view of a conventional aspheric plastic lens. As shown in FIG. 1, the conventional aspheric plastic lens 100 includes a spherical surface portion 110 formed in the center thereof and a flat rib 120 formed on the outer peripheral edge of the spherical surface portion 110. The spherical surface portion 110 includes a curved surface having a predetermined curvature, on which reflected light of an object is incident.

The rib 120 of the aspheric plastic lens 100 has burrs 130 formed to vertically project on the upper and lower surfaces thereof at a different height.

When the conventional aspheric plastic lens 100 having such a structure is laminated and assembled into a lens barrel, the flat surface of the rib 120 should be closely attached on a receiving surface of the lens barrel such that the aspheric plastic lens 10 is horizontally assembled into the lens barrel. However, the burrs 130 formed at a different height on the upper and lower surfaces of the rib 120 come in contact with the receiving surface. Therefore, the lens 100 is tilted due to a height difference between the burrs 130.

As a result, it is difficult to adjust a focus in a lens unit to which the conventional lens 100 is assembled. Further, the reduction in image quality inevitably occurs due to the reduction in resolution.

The occurrence cause of the burrs 130 acting as a serious defect of the lens assembled into the lens unit will be examined with reference to a mold structure of FIGS. 2 and 3.

FIG. 2 is a diagram illustrating an injection mold when the conventional aspheric plastic lens is pressed, and FIG. 3 is a diagram illustrating the injection mold when the pressing is released.

As shown in FIGS. 2 and 3, the mold 200 for manufacturing the conventional aspheric plastic lens 100 is divided into a moving mold 210 and a fixed mold 220, which are symmetrically formed with each other. The moving and fixed molds 210 and 220 respectively include pin cores 211 and 221 and support cores 212 and 222 to which the pin cores 211 and 221 are coupled in the center thereof.

The respective pin cores 211 and 221 coupled to the support cores 212 and 222 of the moving and fixed molds 210 and 220 have electroless nickel-plated surfaces facing each other. As a half-molten lens 100' is pressed between the surfaces, the aspheric plastic lens 100 of FIG. 1 is manufactured.

At this time, a minute clearance 230 is inevitably formed in the coupling portions between the support cores 212 and 222 and the pin cores 211 and 221, respectively. As the half-molten lens 100' is injected, the clearance 230 is further enlarged by the injection pressure. As a result, the burrs 130 having a non-uniform height are inevitably formed on the upper and lower surfaces of the rib 120 of the aspheric plastic lens 100, as shown in FIG. 1.

SUMMARY OF THE INVENTION

An advantage of the present invention is that it provides an aspheric plastic lens and a mold for manufacturing the same. In the aspheric plastic lens, a step portion capable of compensating for a height of a burr, formed in the coupling portion between moving and fixed molds when injection molding is performed, is provided on upper and lower surfaces of the aspheric plastic lens. Accordingly, as the plurality of lenses, which are laminated in a multistage inside a cylindrical lens barrel, are horizontally received, a defect occurring due to tilt of the lenses is prevented. Further, a production yield of a lens unit forming an optical system is enhanced.

Additional aspect and advantages of the present general inventive concept will be set forth in part in the description which follows and, in part, will be obvious from the description, or may be learned by practice of the general inventive concept.

According to an aspect of the invention, an aspheric plastic lens comprises a spherical surface portion having upper and lower portions at the center thereof, the upper and lower portions having curved surfaces with a different curvature, respectively; a rib formed in a circular plate shape so as to extend from the peripheral edge of the spherical surface portion to the outside, the rib having burrs formed to project on the edges of the upper and lower surfaces thereof; and a pair of two-stage step portions formed on the upper and lower surfaces of the rib, the two-stage step portions being formed symmetrically with each other.

According to another further aspect of the invention, the two-stage step portion is composed of a first step portion and a second step portion having a burr formed to project thereon, the first step portion being formed at a depth larger than that of the burr projecting on the second step portion.

According to a further aspect of the invention, the second step portion is formed at a depth of less than 30 μm.

According to a still further aspect of the invention, the second step portion is formed on only one surface of the rib.

According to a still further aspect of the invention, a mold for manufacturing the aspheric plastic lens comprises a moving mold and a fixed mold respectively having pin cores which are rotatably mounted on the central portions of cylindrical support cores, the pin cores coming in close contact with both surfaces of the lens. A concave or convex molding portion is formed in the central portion of an injection surface corresponding to each of the pin cores, and a protrusion is formed on the edge of the injection surface. Further, while the moving mold comes in close contact with one surface of the fixed mold, the lens interposed between the surfaces of the pin cores facing each other is pressed and manufactured so that a pair of two-stage step portions are provided by the shape of processing surfaces of the pin cores and the support cores.

According to a still further aspect of the invention, the protrusion of the pin core is formed to have a height of less than 0.03 mm.

According to a still further aspect of the invention, the protrusion of the pin core is formed to have a width of at least more than 0.2 mm.

According to a still further aspect of the invention, an inclined surface between the protrusion and the injection surface pressing the lens is formed to have an angle of 30° to 60°.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a sectional view of a conventional aspheric plastic lens;

FIG. 2 is a diagram illustrating an injection mold when the conventional aspheric plastic lens is pressed;

FIG. 3 is a diagram illustrating the injection mold when the pressing is released;

FIG. 4 is a diagram illustrating a mold for manufacturing an aspheric plastic lens according to the invention, showing a state where injection molding is performed;

FIG. 5 is an enlarged view of "A" portion of FIG. 4;

FIG. 6 is a sectional view showing a state where the aspheric plastic lens according to the invention is coupled to a lens barrel;

FIG. 7 is a sectional view illustrating a pin core of the mold for molding the aspheric plastic lens according to the invention; and FIG. 8 is a perspective view showing a state where the pin core of the mold for molding the lens according to the invention is partially cut out.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, embodiments of the present invention will be described in detail with reference to the accompanying drawings.

Structure of Aspheric Plastic Lens

FIG. 4 is a diagram illustrating a mold of an aspheric plastic lens according to the present invention, showing a state where injection molding is performed. FIG. 5 is an enlarged sectional view illustrating "A" portion of FIG. 4. FIG. 6 is a sectional view showing a state where the aspheric plastic lens according to the invention is assembled into a lens barrel.

As shown in the drawings, the aspheric plastic lens 10 of the invention includes a spherical surface portion 11 having curved surfaces 11a and 11b formed in the central portion thereof and a rib 12 extending from the peripheral edge of the spherical surface portion 11 to the outside, the rib 12 having a two-stage step portion 13. The curved surfaces 11a and 11b have a predetermined curvature.

The spherical surface portion 11 of the aspheric plastic lens 10 is composed of a convex curved surface 11a and a concave curved surface 11b having a different curvature from each other, the convex curved surface 11a and the concave curved surface 11b being formed symmetrically with each other by reference to the center of the lens 10. Typically, the convex curved surface 11a, i.e. the upper surface of the spherical surface portion 11 has a smaller curvature than the concave surface 11b, i.e. the lower surface of the spherical surface portion 11.

The rib 12 extending from the peripheral edge of the spherical surface portion 11 to the outside has flat surfaces 12a and 12b serving as upper and lower surfaces, respectively, and includes a two-stage step portion 13 having a first step portion 13a and a second step portion 13b, the two-stage step portion 13 continuing into each end of the flat surfaces 12a and 12b.

The two-stage step portion 13 is formed by injection molding using pin cores 21 and 31 of a moving mold 20 and a fixed mold 30 by which both surfaces of the lens 10 are pressed. The first step portion 13a is formed by the mutual pressing between the pin cores 21 and 31, and the second step portion 13b is formed by the pressing between support cores 25 and 35 which are coupled so as to have a contact interface with the pin cores 21 and 31, respectively.

Accordingly, the aspheric plastic lens 10 has a burr 14 formed on the second step portion 13, coming in contact with each boundary surface between the pin cores 21 and 31 and the support cores 25 and 35, by a pressing force of the molds 20 and 30. In other words, the burrs 14 are formed at a non-uniform height on the upper and lower surfaces of the rib 12. Simultaneously, the first step portion 13a is formed at such a depth that the height of the burr 14 can be compensated.

Since the burr 14 is formed at a height of less than about 10 μm at the time of the injection molding of the lens 10, the first step portion 13a is formed at a depth larger than the height. Preferably, the first step portion 13a is formed at a depth of less than 30 μm at the maximum, in order to stably receive the rib 12.

Referring to FIG. 8, while the aspheric plastic lens 10 of the invention having such a structure is sequentially combined inside the cylindrical lens barrel 40, the lower surface of the rib 12 is received on a receiving portion 41 formed to project on the inner wall surface of the lens barrel 40, and the upper surface of the rib 12 is closely attached to the lower surface of a press-in ring 50 for preventing the respective laminated lenses 10 from moving.

In other words, the upper surface of the receiving portion 41 of the lens barrel 40 and the lower surface of the press-in ring 50 respectively come in contact with the flat surfaces 12a and 12b of the rib 12, which horizontally extend from the spherical surface portion 11 of the lens 10 so as to connect the first step portion 13a. Therefore, the lens 10 is mounted horizontally inside the lens barrel 40 without any tilt.

At this time, as the first step portion 13a formed on the rib 12 of the lens 10 is formed at a height larger than that of the burr 14 formed on the second step portion 13b, the burr 14 is positioned in the space formed between the first step portion 13a and the upper surface of the receiving portion 41. Accordingly, when the aspheric plastic lens 10 is assembled into the lens barrel 40, tilt compensation is achieved.

Injection Mold for Aspheric Plastic Lens

Referring to FIGS. 6 and 7, a mold structure for injecting-molding the aspheric plastic lens having such a construction will be described as follows.

FIG. 6 is a sectional view illustrating a pin core of the mold for molding the lens according to the invention, and FIG. 7 is a perspective view showing a state where the pin core of the mold for molding the lens according to the invention is partially cut out.

The lens injection mold according to the invention is divided into a moving mold 20 and a fixed mold 30. The moving mold 20 and the fixed mold 30 respectively include pin cores 21 and 31, by which the lens 10 is pressed and molded, and support cores 25 and 35 to which the pin cores 21 and 31 are rotatably coupled.

While being transferred right and left on one surface of the fixed mold 30, the moving mold 20 presses the half-molten lens 10 interposed between the surfaces of the pin cores 21 and 31 facing each other, thereby manufacturing the aspheric plastic lens 10 in which the rib 12 provided with the two-stage step portion 13 is symmetrically formed. The shape of the pin core 21 of the moving mold 20, which directly presses one surface of the lens 10, will be examined as follows.

The pin core 21 is formed in a cylindrical shape such that the pin core 21 can rotate in the central portion of the support core 25. The pin core 21 has a concave molding portion 22 formed on the central portion of an injection surface on which one surface of the lens 10 is pressed. Further, the pin core 21 has a protrusion 23 for molding the first step portion 13a of the lens 10, the protrusion 23 being formed on the edge of the injection surface.

The protrusion 23 of the pin core 21 is formed by a step cutting process. Further, the protrusion 23 is formed to have a height h of less than 0.03 mm and a width s of at least more than 0.2 mm.

When the height h of the protrusion 23 is set to less than 0.03 mm, the lens 10 is stably mounted on the receiving portion 41 of the lens barrel 40. When the width s thereof is set to more than 0.2 mm, the outer peripheral edge of the protrusion 23 is prevented from being broken at the time of the pressing of the pin core 21.

Further, an angle of an inclined surface 23a between the protrusion 23 and the injection surface is set to range from 30° to 60°. Such a structure facilitates surface-to-surface contact and separation, when the first step portion 13a of the lens 10 formed by the protrusion 23 is surface-processed. Therefore, an excellent processed surface between the first step portion 13a and the flat surface 12a of the rib 12 extending from the spherical surface portion 11 is formed.

According to the aspheric plastic lens and the mold for the same, when the aspheric plastic lens is injection-molded by using the moving mold and the fixed mold, the two-stage step portion is formed on the upper and lower surfaces of the rib by the protrusions formed on the pin cores of the respective molds. Accordingly, the tilt inside the lens barrel, generated by the burrs formed on the upper and lower surfaces of the rib of the lens, is corrected, the burrs being formed by the clearance formed at the coupling interface between the pin core and the support core of the mold. Therefore, it is possible to significantly enhance a production yield of a lens unit composing an optical system.

Further, when the protrusion of the pin core forming the step portion of the aspheric plastic lens is worn down, only the protrusion of the pin core is cut out or ground so as to be reused. Since the protrusion can be used up to the formation range of the burr formed through the clearance of the coupling interface, it is possible to expand a lifespan of the mold.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. An aspheric plastic lens comprising:
   a spherical surface portion having upper and lower portions at the center thereof, the upper and lower portions having curved surfaces with a different curvature, respectively;
   a rib formed in a circular plate shape so as to extend from the peripheral edge of the spherical surface portion to the outside, the rib having burrs formed to project on the edges of the upper and lower surfaces thereof; and
   a pair of two-stage step portions formed on the upper and lower surfaces of the rib, the two-stage step portions being formed symmetrically with each other, a first step portion and a second step portion having a buff formed to project thereon, the first step portion being formed at a depth larger than that of the buff projecting on the second step portion.
2. The aspheric plastic lens according to claim 1, wherein the second step portion is formed at a depth of less than 30 μm.
3. A mold for manufacturing the aspheric plastic lens according to claim 1, the mold comprising
   a moving mold and a fixed mold respectively having pin cores which are rotatably mounted on the central portions of cylindrical support cores, the pin cores coming in close contact with both surfaces of the lens,
   wherein a concave or convex molding portion is formed in the central portion of an injection surface corresponding to each of the pin cores,
   a protrusion is formed on the edge of the injection surface, and while the moving mold comes in close contact with one surface of the fixed mold, the lens interposed between the surfaces of the pin cores facing each other is pressed and manufactured so that a pair of two-stage step portions are provided by the shape of processing surfaces of the pin cores and the support cores.

4. The mold according to claim 3,
wherein the protrusion of the pin core is formed to have a height of less than 0.03 mm.

5. The mold according to claim 3,
wherein the protrusion of the pin core is formed to have a width of at least more than 0.2 mm.

6. The mold according to claim 3,
wherein an inclined surface between the protrusion and the injection surface pressing the lens is formed to have an angle of 30° to 6°.

7. An aspheric plastic lens comprising:
a spherical surface portion having upper and lower portions at the center of the lens, the upper and lower portions having curved surfaces;
a circular flange portion extending outward in a radial direction around the peripheral edge of the curved portions of the upper and lower portions of the spherical surface portion in a direction away from the center of the lens; and
a pair of two-stage step portions formed on upper and lower surfaces of the flange, the two-stage step portions being formed symmetrically with each other;
wherein the depth of a first step portion is formed larger than a burr projected on a second step portion to compensate for errors in mounting.

* * * * *